Dec. 10, 1968  W. P. MOORE ET AL  3,415,823
CHLORINATED ISOCYANURIC ACID PRODUCTION
Filed April 21, 1965

INVENTORS:
WILLIAM P. MOORE
ROB ROY MACGREGOR
BY

ATTORNEY

United States Patent Office 3,415,823
Patented Dec. 10, 1968

3,415,823
CHLORINATED ISOCYANURIC ACID
PRODUCTION
William P. Moore, Chester and Rob R. MacGregor, Hopewell, Va., assignors to Allied Chemical Corporation, New York, N.Y., a corporation of New York
Filed Apr. 21, 1965, Ser. No. 449,765
11 Claims. (Cl. 260—248)

ABSTRACT OF THE DISCLOSURE

A nonmechanical agitating process for the continuous production of chlorinated isocyanuric acid which is useful in the production of herbicides, pharmaceuticals, dyestuffs, etc., said process including the combining of cyanuric acid and alkali metal carbonate. The resultant mixture and gaseous chlorine are pumped into a reactor column having a series of perforated plates positioned therein. As a result of the pumping coupled with the chlorine feed, there is a vigorous gas agitation of the mixture and carbon dioxide dissolved therein as it flows upwardly through the perforated plates, the latter preventing back-mixing. A slurry containing precipitated chlorinated isocyanuric acid and essentially free of nitrogen trichloride is recovered from the top of the reactor.

Figures 1, 2:
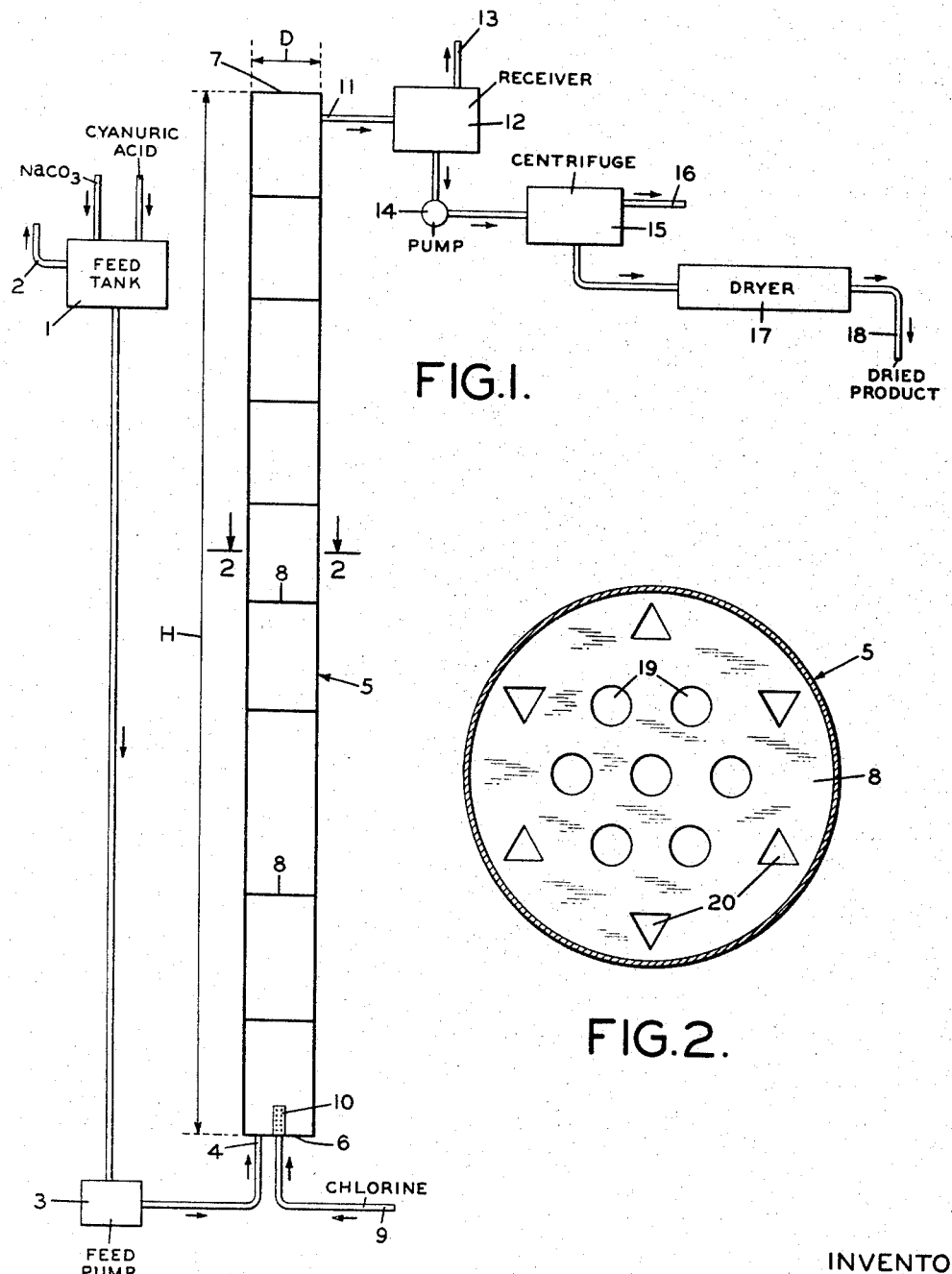

The present invention relates to the production of chlorinated cyanuric acid. More particularly the present invention relates to an improved process and apparatus for the continuous production of di- and trichloroisocyanuric acid.

Chlorinated cyanuric acids and in particular di and trichloroisocyanuric acid are well known. Various approaches to the chlorination of cyanuric acid to obtain these products have been suggested in the prior art. One conventional method involves a batch process wherein cyanuric acid is dissolved in an aqueous alkali solution to produce a solution containing alkali metal cyanurate. The cyanurate solution is cooled and chlorine is added, whereby the alkali metal is replaced by the chlorine to yield the desired chlorinated compound. Batch processes such as this are generally uneconomical since they require the use of large excesses of alkali and chlorine to obtain a completely chlorinated product and produce unwanted side reactions including substantial decomposition of highly chlorinated cyanuric acids.

Batch processes also have the disadvantage of tying up process equipment for long periods of time thus seriously impairing the efficiency of a commercial operation. Accordingly, considerable interest has been generated in continuous processes for chlorinating cyanuric acid. Of the continuous processes for chlorinating cyanuric acid heretofore suggested, the one having the most merit is that wherein the chlorination is carried out in two stages. In the known two-stage process aqueous alkali, cyanuric acid and chlorine are fed continuously into a first reactor maintained at a pH of between 5 and 9 and at a temperature of between 5 and 40° C. The partially chlorinated product is removed from the first reactor and fed with additional chlorine into a second reactor maintained at a pH of between 1.5 and 3.5 and at a temperature of between 5 and 20° C. Chlorinated product is continuously removed from the second reactor.

Although the above-described two-stage process represents an improvement in the production of chlorinated cyanuric acids, many drawbacks are still present. Most significant of these drawbacks is the continual back-mixing of higher chlorinated cyanuric acid with lower or unchlorinated cyanuric acid. When the higher chlorinated cyanuric acid is mixed with the more alkaline lower or unchlorinated cyanuric acid, the higher chlorinated material tends to decompose very rapidly. This is particularly true of unstable chlorinated intermediates such as mono- and dichloroisocyanuric acid. To reduce such decomposition in the above-described two-stage process, strong mechanical agitation is required so that the different reactants, i.e., unreacted and partially chlorinated cyanuric acid in the first stage of the two-stage process may be quickly mixed. In addition, elaborate cooling apparatus is required since a great amount of heat is generated in the first stage and the necessity of removing this heat of reaction severely limits the production rate.

Accordingly, it is a primary object of the present invention to provide a simple, efficient and economical process and apparatus for continuous production of chlorinated cyanuric acid in high yields.

It is a further object of the present invention to provide such a process wherein decomposition of chlorinated products is avoided and no undesirable by-products are formed.

Still a further object of the present invention is to provide such a process which does not require the use of costly and complex cooling equipment.

These and other objects and advantages of the present invention will become more apparent from the detailed description set forth hereinbelow.

In accordance with the process of the present invention, cyanuric acid is mixed thoroughly with an aqueous solution containing an equivalent amount of alkali metal carbonate to give the equivalent di- or trialkali metal cyanurate. The cyanuric acid and alkali metal carbonate should be reacted at sufficiently low temperatures so as to retain a major portion of the carbon dioxide produced in solution. The resulting slurry or solution having a pH of about 8 to 11 and a gaseous stream containing chlorine gas are fed continuously to the bottom of a vertical reactor column and are passed cocurrently upwardly through a series of perforated plates positioned in the reactor column. Chlorinated isocyanuric acid product produced by the reaction of chlorine with the alkali metal cyanurate is precipitated into the reaction mixture. Passing the reaction mixture upwardly through the perforated plates in the reactor column causes it to be vigorously agitated by said gaseous stream and evolved carbon dioxide to provide good contact between the chlorine gas and the alkali metal cyanurate or partially chlorinated cyanuric acid, while preventing substantial back-mixing of higher chlorinated cyanuric acid with lower or unchlorinated cyanuric acid. Slurry having a pH of about 2.5 to 4.5 and containing precipitated chloroisocyanuric acids is withdrawn from the top of the reactor column and the precipitated material is recovered as a solid product.

In carrying out the above-described process, the feed mixture is prepared by reacting cyanuric acid, preferably in a finely divided form, with an aqueous alkali metal carbonate solution at a relatively low temperature, e.g., 20–30° C. so that at least 50% of the carbon dioxide generated by reaction of the alkali metal carbonate with the cyanuric acid is retained in solution in the feed mixture. The use of an alkali metal carbonate in preparing the feed mixture is important because, in the initial high chlorine absorption zones, evolution of the carbon dioxide retained in solution in the feed mixture moderates the heat evolved and in later chlorination zones the $CO_2$ evolved aids in agitating the reaction mixture and suspending the precipitated product.

Any alkali metal carbonate will be useful in preparing the feed mixture in accordance with the present invention. Particularly good results have been obtained by the use of sodium or potassium carbonate. The pH of the feed mixture containing alkali metal cyanurates will normally have a pH range of about 8 to 11. The concentration of alkali metal cyanurate in the feed mixture is not critical and may vary over a wide range. Particularly advantageous results are obtained when the alkali metal cyanurate is present in the feed mixture in amounts of about 3 to about 20% by weight.

The feed mixture prepared as described above is continuously fed to the bottom of a tower-type reactor column containing a plurality of perforated plates as will hereinafter be described in more detail. The reactor column contains a sufficient number of perforated plates so as to divide the column into a minimum of four contiguous reaction zones or compartments. Chlorine gas, preferably mixed with air or some other inert gas, is fed to the bottom of the reaction column through a sparger. The feed mixture and the gaseous stream containing chlorine are passed concurrently, upwardly through the reactor column. As the mixture passes upwardly through the reactor column, the degree of chlorination of the cyanurate increases, and the pH of the reaction mixture decreases accordingly to provide ideal conditions for maximum chlorination rate with minimum decomposition. Thus, the process of the present invention allows a somewhat wider range of satisfactory chlorination conditions than previous processes by providing an ideal chlorination climate for each stage of chlorination, i.e., basic conditions for unchlorinated or lightly chlorinated mixtures, near neutral for partially chlorinated intermediates and acidic conditions for highly chlorinated isocyanuric acid products.

The temperature of the reactor column may range from about 4° C. to 85° C. and may vary throughout the different reaction zones or compartments of the reactor. The heat of reaction is usually reduced sufficiently by the evolution of $CO_2$ and by blowing with air or other inert gas so that no external cooling need be applied to the reactor column. The reactor may be allowed to operate adiabatically if desired. Preferably the temperature of the reactor column should be in a range of about 25–40° C. during the production of dichloroisocyanuric acid and about 10–25° C. during the production of trichloroisocyanuric acid. Normally, the reaction pressure is near atmospheric at the top of the reactor column while the pressure at the bottom of the column may be as high as 15 p.s.i.g.

In theory, the amount of chlorine to be added to the reactor column for each mol of cyanurate in the feed slurry is two mols for the production of dichloroisocyanuric acid and three mols for the production of trichloroisocyanuric acid. Because of the efficient manner in which the chlorine is used in the process and apparatus of the present invention, little or no excess chlorine need be provided. In any event, the amount of excess chlorine provided should never be required to exceed about 10 mol percent.

The turbulence created by the unreacted chlorine gas and desorbed carbon dioxide in the reactor column may provide sufficient agitation for carrying out the process of the present invention. However, the reaction velocity is increased where air or other inert gas such as nitrogen is sparged into the reaction column along with the chlorine gas. When lower amounts of air or inert gas are used, agitation is reduced thereby reducing the reaction velocity. When larger amounts of air or inert gas are used, the chlorine gas becomes too diluted which also adversely affects the reaction velocity. Particularly advantageous results are obtained when the weight ratio of chlorine gas to inert gas or air is about 0.1–0.5/1.

The excellent contact between the chlorine gas and reaction mixture and the technique of chlorination in stages at ideal conditions as provided in the process of the present invention allows the use of low retention times for the reaction mixture in the reactor. Normally, satisfactory results are obtained using retention times of about 2 to 12 minutes.

Air or inert gas, if used, evolved carbon dioxide and any unreacted chlorine gas may be vented at the top of the reactor column. Slurry is continuously withdrawn from the top of the reactor column and sent through a centrifuge or filter to recover the precipitated chlorinated isocyanuric acid product. The recovered solid product may then be washed and dried by any suitable conventional means. The recovery method is not considered critical but improved yields and recoveries are obtained by minimizing hold times and temperature during centrifugation. Hold times are preferably less than one hour and temperatures are preferably 25° C. or less.

A preferred procedure for the continuous chlorination of cyanuric acid in accordance with the present invention will now be described with reference to FIGURE 1 of the drawing. An aqueous sodium carbonate solution and powdered cyanuric acid are vigorously agitated in feed tank 1 whereby a slurry containing sodium cyanurate is formed with a majority of the carbon dioxide resulting therefrom being retained in solution in the slurry. Any carbon dioxide which is evolved may be vented through a suitable vent tube 2 in the feed tank 1. The aqueous sodium cyanurate slurry containing carbon dioxide dissolved therein is continuously fed by feed pump 3 into the bottom of the chlorination reactor column through inlet pipe 4.

Reactor column 5 comprises an elongated vertical column with a bottom plate 6 and a top plate 7 having a height H to diameter D ratio of at least 10 to 1 and preferably 20 to 1 to provide optimum contact between the chlorine gas and the feed slurry. The large height to diameter ratio of the reactor column provides a long travel path for the chlorine gas as it rises through the reaction mixture. The longer the chlorine is held in contact with the reaction mixture the more efficiently the chlorine is utilized.

The chlorination reactor column 5 is divided into a minimum of four contiguous reaction zones or compartments by a plurality of thin perforated plates 8 positioned therein. The plates are constructed with small holes as in a sieve-plate distillation column to provide good contact between the chlorine gas and the reaction mixture in each zone. The perforated plates cause considerable turbulence in the flow of the chlorine gas, carbon dioxide and added air or inert gas as they pass upwardly through each reaction zone thus creating violent agitation of the reaction mixture within the reaction column. Slots are preferably provided along the periphery of the plates to allow gas agitation along the walls of the reactor column thus preventing buildup of sedimentation of any precipitated product.

The perforations in the plates in the reactor column are designed to permit the feed slurry containing precipitated chlorinated isocyanuric acid and gases to flow upwardly through the reactor column, while preventing substantial back-mixing of higher chlorinated isocyanuric acid with lower chlorinated isocyanuric acid. Prevention of significant back-flow of the reaction mixture from one reaction zone to a preceding zone by the perforated plates is an important feature of the present invention. It is most important to prevent a highly chlorinated isocyanuric acid, for example dichloroisocyanuric acid, from flowing back into contact with the feed mixture just entering the reactor column since the feed mixture is strongly basic and would cause rapid decomposition of the dichloroisocyanuric acid.

The perforated plates are advantageously uniformly spaced throughout the length of the reactor column. However, it is preferable that no plate be located in the region between about 20 and about 40% of the way up through the reactor column. For reasons not well understood, buildup of solids on plates located in this region is excessive and causes plugging thus seriously hampering flow through the reactor column.

Chlorine gas from a suitable supply is continuously fed through line 9 to the bottom of the reactor column 5 where it enters the column through a sparger 10. Compressed air or other suitable inert gas such as nitrogen may be mixed with the chlorine gas supplied to the bottom of the reactor column 5.

The aqueous sodium cyanurate slurry containing $CO_2$ is fed to the reactor column and product slurry withdrawn at a rate such that retention time in the reactor is about 2 to 12 minutes. Carbon dioxide contained in the slurry is released as the chlorination proceeds and buffers the reaction mixture to a considerable extent. The reaction mixture is strongly agitated in the lower reactor zones by chlorine gas and compressed air or other inert gas if added. In the upper zones of the reactor column agitation is effected by evolved carbon dioxide and air or other inert gas if present. The pH of the reaction mixture continuously decreases as the chlorination proceeds, but the reaction mixture does not become strongly acidic until all the buffer effect is gone and the carbon dioxide is completely evolved which usually takes place near the top of the reactor column.

Slurry containing precipitated chlorinated isocyanuric acid is continuously withdrawn through outlet 11 at the top of the reactor column 5. The withdrawn slurry is conveyed to product receiver 12 wherein carbon dioxide, air or inert gas and excess chlorine are vented or recycled through line 13. The slurry is pumped from product receiver 12 by slurry pump 14 into the product centrifuge 15. The mother liquor from centrifuge 15 is discharged through line 16. Normally the centrifuge cake is washed with cold water and then discharged to a suitable dryer such as a rotary dryer 17, where the product is dried thoroughly. The dried product is then discharged through line 18 to product containers.

FIGURE 2 of the drawing illustrates the preferred construction of a perforated plate 9 for use in the reactor column in accordance with the present invention. The holes 19 in perforated plate 9 should be small enough to prevent back-flow and to give good gas-liquid contact and yet large enough to prevent high pressure drops through the reactor. Preferably, the holes are of a size whereby the ratio of reactor column diameter to hole diameter is 8 to 10 to 1. The holes are spaced in the plate so as to be separated by a distance of at least 1 hole diameter. Perforated plate 9 preferably is provided with a series of slots cut in the shape of an equilateral triangle along the outer periphery thereof to provide agitation in the areas of the reactor column walls. The sides of these triangular slots are preferably a length which is equal to about 10 to 20% of the column diameter and are separated by a distance of 3 or more lengths of a side.

The following examples will illustrate various aspects of the present invention, but it is to be understood that the invention is not limited to the details therein. Parts and percentages are by weight unless otherwise specified. Temperature is given in degrees centigrade.

EXAMPLE 1

Dichloroisocyanuric acid

The reactor column used in this example was constructed of a 4 inch Pyrex glass pipe 8 ft. in height and having a 4 inch diameter, thus giving a height/diameter ratio of 24/1. The reactor column contained a 1 inch diameter bayonet type heat exchanger located in the center of the column and extending from the top of the reactor column to within 4 inches of the bottom of the column. Four 4 inch in diameter Teflon ⅛ inch thick baffle plates were supported by the bayonet. These plates are located 1.5 ft., 3 ft., 4.5 ft. and 6 ft. respectively from the bottom of the reactor column and were snugly fitted to the wall of the column. The baffle plates contained a center hole to accommodate the cooling bayonet and were provided with eight ⅜ inch diameter holes spaced equally on a circle 1 inch from the center of the plate. The plates were additionally provided with four triangular slots spaced equally along the periphery thereof. The slots were cut as equilateral triangles having ⅜ inch sides.

An aqueous slurry was prepared by mixing 129 parts of finely ground cyanuric acid and 989.4 parts of water and then adding 108.1 parts of sodium carbonate with vigorous agitation while maintaining the temperature at about 25° C. 22.0 parts of carbon dioxide were evolved. This aqueous mixture was maintained as a slurry in an agitated stainless steel tank and used as a continuous feed supply to the bottom of the dichloroisocyanuric acid synthesis reactor column. Other feed materials used in the dichloroisocyanuric acid synthesis were cylinder chlorine gas and compressed air which were also fed to the bottom of the reactor column. The slurry and the gas feed were sent through separate ¼ inch standard Hastelloy C pipes and metal-glass couplings to the bottom of the reactor with no sparger. Both the slurry and the gaseous products overflowed from the top of the reactor column through a single one inch in diameter pyrex pipe to an agitated Hastelloy C degasser 6 inches in diameter x 12 inches in height.

After the reaction system was operated to achieve steady state conditions, a 6 hour test period was started. Slurry feed was pumped by a sigma type pump at a rate of 240.90 lbs. per hour. This feed slurry had the following composition.

| Component: | Wt. percent |
| --- | --- |
| Disodium cyanurate | 14.36 |
| $Na_2CO_3$ | 0.17 |
| $H_2O$ | 83.63 |
| $CO_2$ | 1.84 |
| | 100.0 |

Vaporized chlorine at the rate of 33.41 lbs. per hour was mixed with 3.34 lbs. per hour of compressed air and fed to the bottom of the reactor column. The reactor column was operated at 33° as controlled by passing water through the bayonet cooler. Pressure at the top of the reactor was atmospheric. Operation was continuous with vigorous gas agitation occurring in each of the five zones or compartments created by the four baffle plates positioned in the reactor column. Agitation in the lower zones or compartments was primarily caused by chlorine gas and air bubbling through the holes and slots in the baffle plate, while in the upper zones or compartments of the reactor column agitation was mainly effected by carbon dioxide released in the acid solutions and by compressed air. The gases passing through the triangular slots in the outer periphery of the plates prevented build up of solids on the walls of the reactor column. The perforated plates caused the chlorine gas to pass through the reactor column in a turbulent finely divided state, thereby providing good contact with the cyanurate feed slurry. The following pH readings were obtained in each of the five contiguous compartments or zones identified by the perforated plates positioned in the reactor column, from bottom to top: (1) 8.3, (2) 8.1, (3) 7.9, (4) 6.4, and (5) 2.5.

Slurry containing the precipitated chlorinated isocyanuric acid product overflowed from the top compartment or zones of the reaction column into the degasser where 12.76 lbs. per hour of gas with the following composition was vented.

| Component: | Wt. percent |
|---|---|
| CO$_2$ | 35.84 |
| O$_2$ | 5.83 |
| N$_2$ | 20.40 |
| Cl$_2$ | 27.06 |
| Others (by difference) | 0.87 |
| | 100.0 |

The degassed slurry which had been cooled to about 7° was taken from the bottom of the degasser and conveyed to a titanium centrifuge where it was centrifuged. The centrifuge cake was washed twice while in the centrifuge with water having a temperature of 5°. The wash water was discarded from the centrifuge and the cake was conveyed to a hopper from which it was continuously fed through a titanium rotary dryer operated at 140°. 34.63 lbs. per hour dried dichloroisocyanurate product was continuously discharged from the dryer. The dried dichloroisocyanurate product had an available chlorine content of 71.4% and more than 99% purity. The rate of production of dichloroisocyanuric acid (as recovered dry product) was 57.7 lbs./(ft.$^3$ reactor volume) (hour) and the yield was 87.5% based upon cyanuric acid fed to the system. No NCl$_3$ was detectable in either the liquid reactor affluent or the final product.

EXAMPLE 2

Trichloroisocyanuric acid

A feed slurry was prepared by mixing 129 parts of finely ground cyanuric acid with 1161.0 parts aqueous sodium carbonate solution containing 14.1% sodium carbonate while maintaining the temperature at about 25° C. 24.0 parts carbon dioxide were evolved during the preparation of the slurry. The slurry was maintained in an agitated stainless steel tank and used as a source of sodium cyanurate slurry for continuously feeding the reactor column. Other feed materials used in the synthesis of trichloroisocyanuric acids were cylinder chlorine gas and compressed air.

The same reactor column apparatus as described in Example 1 was used to prepare trichloroisocyanuric acid in this example. The reaction system was allowed to operate at a steady state condition before a 6 hour test period was started. Feed slurry was pumped by a sigma-type pump at a rate of 164.7 lbs. per hour to the bottom of the reactor column. The feed slurry had a composition as follows:

| Component: | Wt. percent |
|---|---|
| Trisodium cyanurate | 15.4 |
| Na$_2$CO$_3$ | 0.4 |
| CO$_2$ | 3.5 |
| H$_2$O | 80.7 |
| | 100.0 |

Vaporized chlorine was fed to the bottom of the reactor column through a sparger at a rate of 30.89 lbs. per hour along with 4.01 lbs. per hour of compressed air. The reactor column was operated at 14° by pumping chilled water through the bayonet cooler. Pressure at the top of the reactor column was atmospheric. All feed rates were maintained constant throughout the 6 hour test period with vigorous gas agitation occurring in each of the five compartments or zones. The progression of chlorinated isocyanuric acid formation through the reactor was smooth with the following pH being measured in each of the particular zones or compartments from bottom to top: (1) 8.8, (2) 8.0, (3) 7.1, (4) 6.1, and (5) 2.9.

Slurry is withdrawn from the top of the reactor column and conveyed to a stainless steel degasser where 13.11 pounds per hour of gas having the following composition was vented.

| Compound: | Wt. percent |
|---|---|
| Air | 23.6 |
| CO$_2$ | 52.1 |
| Cl$_2$ | 20.9 |
| H$_2$O | 3.4 |
| | 100.0 |

The degassed slurry which was cooled at 14° C. was withdrawn from the bottom of the degasser and conveyed to a titanium perforate basket centrifuge where it was centrifuged. The product cake was washed in the centrifuge with 129.9 pounds of water having a temperature of 14° C. The washed water was discarded and the centrifuge cake was conveyed to a hopper and then to a rotary drier which was operating at a temperature of 140° C. Dried trichloroisocyanuric acid with 91.3% available chlorine and 99+% purity was continuously discharged at the rate of 26.2 pounds per hour from the rotary drier. The rate of production of recovered dried trichloroisocyanuric acid product was 43.6 (pounds per hour) (ft.$^3$ reactor volume) based on a 0.6 ft.$^3$ usable reactor volume. The overall yield of trichloroisocyanuric acid based on cyanuric acid fed to the reactor column was 86.6%. No NCl$_3$ was detected in the reactor effluents.

We claim:

1. A nonmechanical agitating process for the continuous production of chlorinated isocyanuric acids which comprises:
   (a) combining cyanuric acid with an aqueous solution of alkali metal carbonate to form an aqueous mixture containing the corresponding alkali metal cyanurate and dissolved carbon dioxide,
   (b) continuously feeding said mixture under pressure to the bottom of a vertical reactor column,
   (c) continuously feeding gaseous chlorine under pressure to the bottom of said reactor column,
   (d) pumping said mixture and said gaseous chlorine cocurrently under sufficient pressure to force same upwardly through a series of perforated plates positioned in said reactor column, said pumping coupled with said feeding of the gaseous chlorine into the bottom of the reactor column resulting in a vigorous gas agitation of said mixture and carbon dioxide, the perforated plates preventing substantial back-mixing of higher chlorinated isocyanuric acid with lower chlorinated isocyanuric acid having a relatively lower pH than the higher chlorinated isocyanuric acid, and
   (e) withdrawing slurry essentially free of nitrogen trichloride and containing precipitated chlorinated isocyanuric acid from the top of said reactor column.

2. The process of claim 1 wherein the molar ratio of alkali metal carbonate to cyanuric acid is about 2:1 and said precipitated chlorinated isocyanuric acid is essentially dichloroisocyanuric acid.

3. The process of claim 1 wherein the molar ratio of alkali metal carbonate to cyanuric acid is about 3:1 and said precipitated chlorinated isocyanuric acid is essentially trichloroisocyanuric acid.

4. The process of claim 2 wherein said reactor column is maintained at a temperature of about 25 to 40° C.

5. The process of claim 3 wherein said reactor column is maintained at a temperature of about 10 to 25° C.

6. The process of claim 1 wherein said gaseous chlorine is admixed with a component selected from the group consisting of air or inert gas, the weight ratio of said component to chlorine gas being about 0.1:0.5:1.

7. The process of claim 1 wherein said mixture initially has a pH of about 8 to 11 and said slurry has a pH of about 2.5 to 4.5.

8. The process of claim 1 wherein said alkali metal carbonate and cyanuric acid are combined at a temperature not above about 30° C. whereby at least a major portion of carbon dioxide formed by reaction of said carbonate with cyanuric acid is retained in solution in said mixture.

9. The process of claim 1 wherein said reactor column is maintained at a temperature of about 4° to 85° C.

10. The process of claim 1 wherein said mixture is retained in said reactor column for about 2 to 12 minutes.

11. The process of claim 7 wherein the pH of said mixture progressively decreases as said mixture passes upwardly through said reactor column.

References Cited

UNITED STATES PATENTS

| | | | |
|---|---|---|---|
| 2,206,495 | 7/1940 | Beardsley et al. | 23—283 |
| 2,964,525 | 12/1960 | Robinson | 260—248 |
| 3,052,990 | 9/1912 | Tailor | 23—283 |
| 3,073,823 | 1/1963 | Merkel et al. | 260—248 |

HENRY R. JILES, *Primary Examiner.*

J. M. FORD, *Assistant Examiner.*